United States Patent [19]

Worlton, deceased et al.

[11] 4,039,375
[45] Aug. 2, 1977

[54] DETECTION OF FUEL ROD LEAKAGE

[75] Inventors: Dan C. Worlton, deceased, late of Richland, Wash., by June S. Worlton, administratrix; Dan L. Robinson, Richland, Wash.

[73] Assignee: Exxon Nuclear Company, Inc., Bellevue, Wash.

[21] Appl. No.: 588,858

[22] Filed: June 20, 1975

Related U.S. Application Data

[60] Division of Ser. No. 422,383, Dec. 6, 1973, Pat. No. 3,969,187, which is a continuation-in-part of Ser. No. 251,936, May 10, 1972, abandoned.

[51] Int. Cl.² ............................................. G21C 17/00
[52] U.S. Cl. ................................................. 176/19 LD
[58] Field of Search ............................ 176/19 LD, 80

[56] References Cited

U.S. PATENT DOCUMENTS

| 3,813,286 | 5/1974 | Goldman et al. | 176/19 LD |
| 3,823,068 | 7/1974 | Worlton et al. | 176/80 |
| 3,846,235 | 11/1974 | Jones et al. | 176/80 |

Primary Examiner—Harvey E. Behrend
Attorney, Agent, or Firm—Harold N. Wells; F. Donald Paris

[57] ABSTRACT

Nuclear reactor fuel rod leakage is determined by measurement of vibrational characteristics of a resilient, flexible means sealed within the upper end caps of the fuel elements. The flexible means, which is preferably a metallic diaphragm, is set into motion by the impact of an internal metal rod which is operated by an external magnetic field, thereby permitting an indication of the pressure inside a fuel element without disturbing the welded assembly. The metal rod is activated and the vibration measurements are made through the use of a special tool which fits near the end cap of the fuel element to be tested.

5 Claims, 8 Drawing Figures

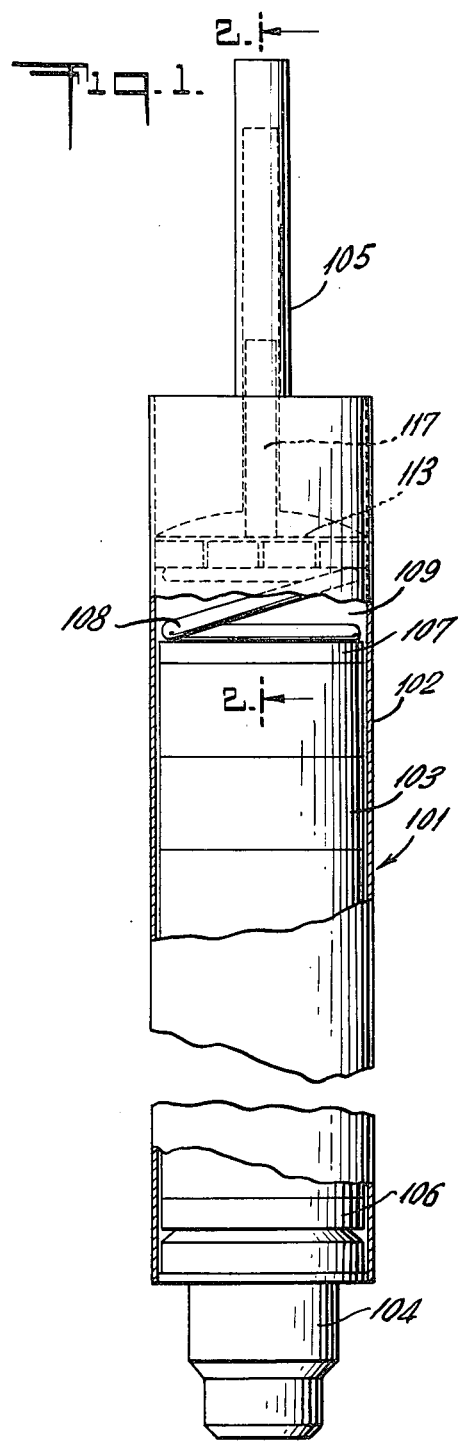

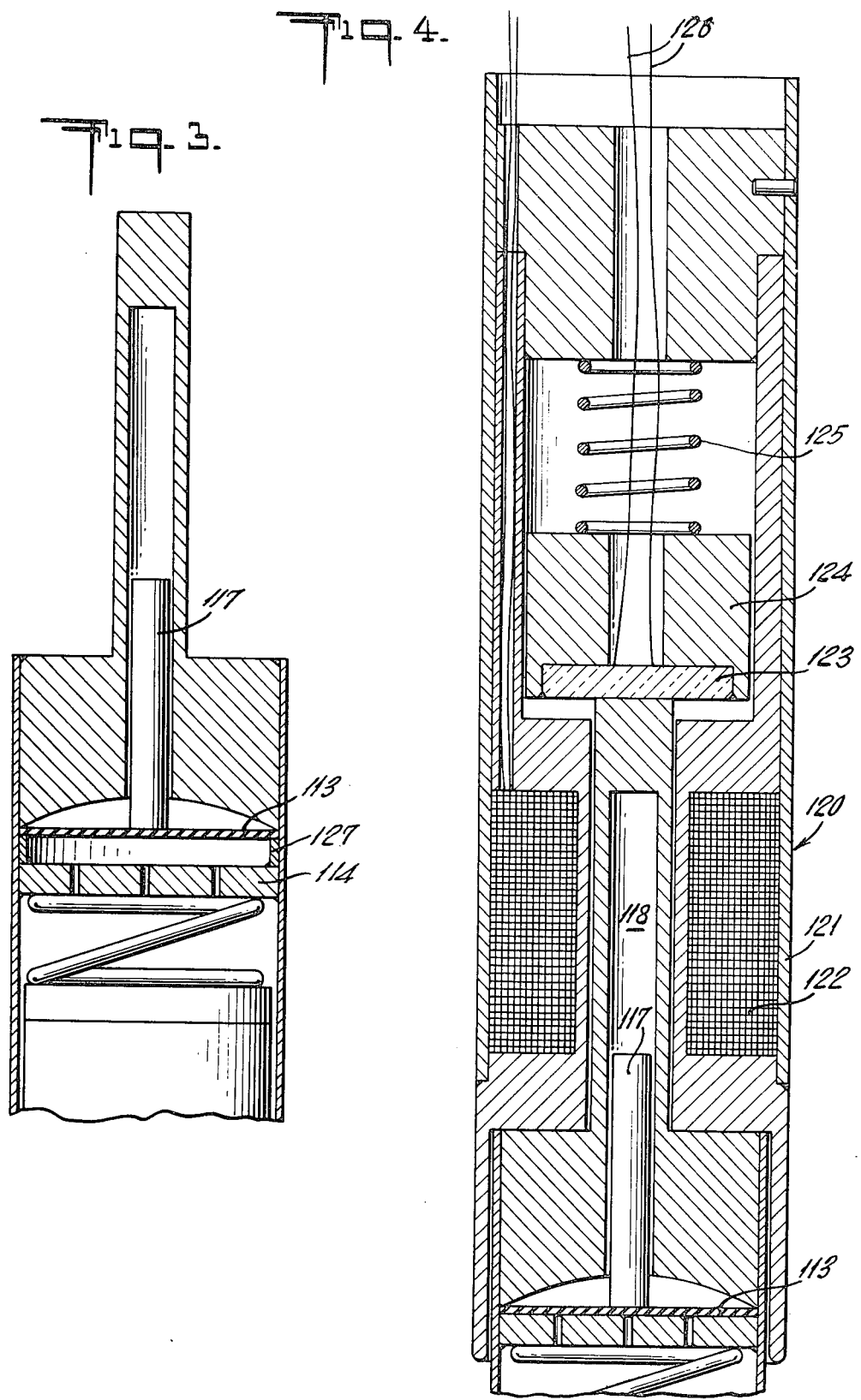

DETECTION OF FUEL ROD LEAKAGE

CROSS REFERENCE TO RELATED APPLICATIONS

This is a division of application Ser. No. 422,383, filed Dec. 6, 1973, now U.S. Pat. No. 3,969,187, which is a continuation-in-part of U.S. Ser. No. 251,936 filed May 10, 1972, now abandoned.

BACKGROUND OF THE INVENTION

This invention relates to nuclear reactors and, in particular, to a method and apparatus for determining if a nuclear reactor fuel rod is leaking.

One problem faced in the utilization of nuclear power as an energy source is the radioactive contamination of the reactor facility. One source of such contamination is leakage of fission product gases and other radioactive materials from a fuel element during reactor operation. These contaminants then enter the coolant material and are carried to other areas in the reactor facility. When such contamination occurs, it is necessary that nuclear fuel bundles which have prematurely failed be removed from the reactor core and replaced with fresh fuel. The replacement process, normally accomplished during scheduled plant outages, involves two steps. First, fuel bundles suspected of containing defective fuel pins are identified, then they are removed and replaced with good fuel bundles. After removal, suspect bundles may be disassembled, the defective fuel rods segregated by nondestructive examination, and then reassembled with good fuel rods.

With present practice, identification of faulty fuel, either in-core or after bundle disassembly, is a time-consuming process which contributes substantially to the overall cost of reconstituting the fuel load.

Attempts have been made to reduce and overcome the disadvantages of the standard practice by devising various methods for rapidly testing the fuel rods for leakage without having to remove them from the reactor core, see U.S. Pat. Nos. 3,296,846, 3,230,771 and 3,350,271. These methods have not been successful because the methods could not accurately determine the leakage or the apparatus could not function in the reactor environment.

In copending application, Ser. No. 200,698, filed Nov. 22, 1971, now U.S. Pat. No. 3,823,068, a method to detect fuel pin leakage without removing the fuel elements from the reactor is disclosed wherein the fission gas pressure activates a flexible diaphragm or bellows assembly to produce measurable fluctuations in an eddy current established about the fuel rod upper end cap.

It is an object of this invention to provide another method and apparatus for facilitating the detection of fuel pin leakage and reducing downtime for nuclear reactors.

SUMMARY OF THE INVENTION

It has been found that fuel pin leakage can be rapidly determined by measuring the vibrational characteristics of a flexible means located in a specially constructed upper end cap assembly. This test may be done without removing the fuel bundles from the reactor or alternatively may be done after the suspected bundles have been removed.

The upper end cap assembly comprises a particularly designed upper end cap, a resilient means which is usually a metallic diaphragm and a disc having bleed holes. The upper end cap is designed so that its shoulder section fits into the upper portion of a fuel rod and it is sealed thereto. The shoulder section has a concave bottom surface and an axial cavity that extends from the concave surface into the adjoining shank section of the end cap. A resilient, flexible metal diaphragm is placed next to the bottom surface of the shoulder section, thus forming a cavity sealed from the remainder of the fuel rod. Adjacent the diaphragm and outside the sealed cavity is a perforated disc which permits pressure buildup in the fuel rod to be exerted against the diaphragm. Such pressure buildup will cause a movement of the diaphragm and such movement can be detected by measuring the vibrational characteristics of the diaphragm, which has been found to vary depending on the pressure. The diaphragm is conveniently set into vibration by a metal rod positioned within the axial cavity of the end cap shank (within the sealed cavity). Preferably this is done by lifting the rod with an external magnetic field and releasing it. The kinetic energy of the rod is dissipated by its impacts with the diaphragm. The number and amplitude of the bounces can then be detected by an acoustic sensor placed on the external surface of the end cap shank section. In addition, the characteristic resonant frequencies of the diaphragm and the end cap may be measured. As will be described more completely below, by examining the vibrational frequencies it is possible to determine whether a normal pressure buildup has occurred in the fuel rod or, if the rod is leaking, that no significant pressure is present.

BRIEF DESCRIPTION OF THE DRAWINGS

FIG. 1 is a side elevation view, partly in section, of a fuel rod utilizing the upper end cap assembly of this invention.

FIG. 2 is a cross-sectional view taken at line 2—2 of the fuel element shown in FIG. 1, showing one embodiment of the invention.

FIG. 3 is similar to FIG. 2, but illustrates an alternative embodiment of the invention.

FIG. 4 is an assembly view of a probe for use with the end cap of the invention.

DESCRIPTION OF THE PREFERRED EMBODIMENTS

Figure 7:
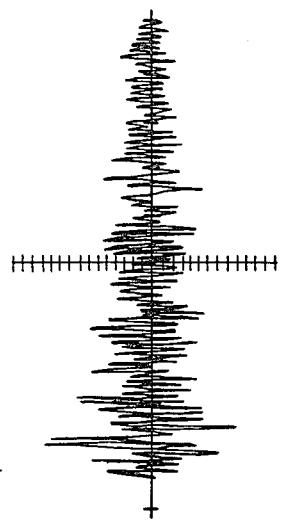
FIG. 7 illustrates the vibrational frequencies characteristic of the embodiment of FIG. 3 with the fuel rod at zero pressure.

While the invention may be used with any shape fuel rod, it is particularly suited to the thin, cylindrical fuel rods normally used in pressurized boiling water reactors. As seen in FIG. 1, the fuel pin 101 comprises a thin tube 102 which houses the nuclear fuel pellets 103. Inside the tube 102 the pellets 103 are separated from the lower end cap 104 and the upper end cap 105 by insulating discs 106 and 107, respectively. The pellets 103 are held in position by a spring 108 located in plenum chamber 109 formed between disc 107 and upper end cap 105. More particularly, spring 108 is upwardly restrained by upper end cap 105 which is welded to the upper end of fuel rod 101. The spring 108 pushes down on disc 107 and pellets 103, holding them against disc 106 and lower end cap 104 which is welded to the lower end of fuel rod 101.

During operation of the reactor, fuel pellets 103 produce fission product gases as they emit neutrons and generate heat. These gases accumulate in plenum chamber 109, resulting in a pressure buildup which can exceed 2500 psig after a long period of operation. This pressure, in combination with the temperature and physical stresses placed on fuel pin 101, may result in small cracks within tube 102. If this occurs, the highly radioactive fission product gases may escape from the fuel rod and enter into the reactor core cooling system. To detect leakage of these gases the radioactivity level of the reactor core coolant is constantly monitored. If the level exceeds a predetermined limit, the reactor core is inspected to determine which fuel rods are leaking. The upper end cap assembly of this invention greatly simplifies locating a leaking fuel rod.

As seen in FIG. 2, in a preferred embodiment, the upper end cap assembly comprises an upper end cap 105, a flexible diaphragm 113 and a disc 114 having bleed holes 115. The upper end cap is designed so that its shoulder section 105A figs snugly into tube 102 to seal the upper portion of the fuel element, being attached by welds 110. Shoulder section 105A is provided with a concave bottom surface 105A' which faces toward plenum chamber 109. Within shoulder section 105A and extending into shank section 105B of end cap 105 is an axial cavity 116. The axial cavity is preferably cylindrical and centered in the end cap and of larger diameter and length than required to contain rod 117.

The resilient metal diaphragm 113 is preferably attached to end cap 105 where the concave surface 105A' meets the tube wall 102. It is attached so that cavity 118 is formed which opens up into axial cavity 116, but which is sealed from plenum chamber 109.

Directly below diaphragm 113, disc 114 is suitably attached to tube 102, e.g. by welding under vacuum. In the embodiment of FIG. 2 the diaphragm 113 and disc 114 are positioned so that the diaphragm 113 will lie flat on the upper surface 114A of the disc when it is not being flexed. Disc 114 is provided with at least one bleed hole 115 which extends through the disc allowing fission product gases in plenum chamber 109 to contact the lower surface 113A of diaphragm 113.

During reactor operation, the fission product gases build up in the plenum chamber 109 and exert pressure on the diaphragm 113 through bleed holes 115. This pressure causes the diaphragm to flex up into cavity 118 as is shown in FIG. 2. To determine if pressure has built up in the fuel element, the diaphragm is forced into resonant vibration. This may be done in various ways.

In the preferred embodiment, rod 117 is lifted by an electromagnetic field (shown in FIG. 4 as externally applied and then dropped against the diaphragm when the electromagnetic field is switched off. The rod strikes the resilient surface 113B of the diaphragm and sets up resonant vibrations. These vibrations are then damped by energy transfer from the rod to the diaphragm and also to the disc if the diaphragm is in contact with it. The vibration amplitude and rate of dampening is dependent upon the resiliency of the diaphragm, which in turn depends upon the pressure in the fuel element and also upon whether the diaphragm is contacting either disc 114 or the concave surface 105A.

Figure 5:
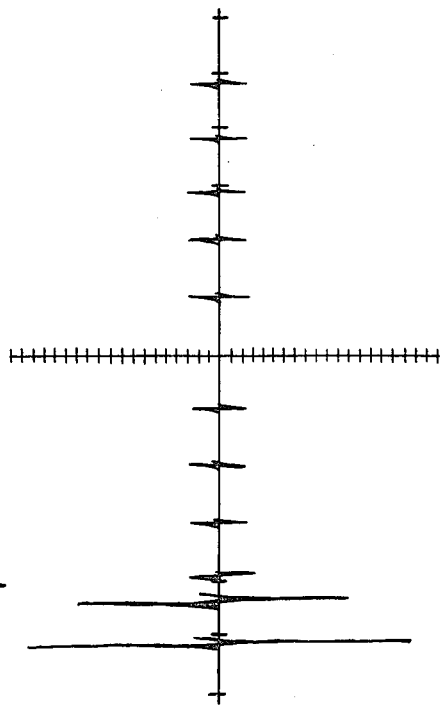
FIG. 5 illustrates the vibrational frequencies characteristic of the embodiment of FIG. 2 with the fuel rod at zero pressure.

If there is leakage in the fuel element, the pressure will be quite low. This results in very little flexing of the diaphragm. Thus, when the rod strikes the upper surface of the diaphragm, it contacts a "hard" elastic system since the downward motion of the diaphragm is restricted by the disc. In this case, the kinetic energy of the rod is quickly dissipated with only a few bounces. This is illustrated in FIG. 5, which will be discussed in more detail hereinafter.

If there is substantial pressure built up in the fuel rod, as there ordinarily would be after a period of operation, then the rod will strike the diaphragm when it is not restricted by the disc. The energy of the rod is not quickly dissipated as can be seen by comparing the results of FIG. 6 with those of FIG. 5.

It will be apparent to one skilled in the art that the invention is broader in scope than illustrated by the specific embodiment disclosed i.e. detecting vibrations characteristic of a diaphragm restricted at its edges. Other vibrating elements could be used within the scope of the invention.

Detection of fuel rod leakage may be done either in place in a nuclear reactor or after individual bundles have been removed and replaced for testing. It will be obvious to one skilled in the art that the shut down of a nuclear reactor is a relatively complicated and time-consuming procedure. Thus, in order to expedite the testing for leaking fuel rods it may be desirable to attempt to test the fuel bundles in place. This, however, does require the removal of the end plates, which substantially cover the end caps 2 which access must be had in order to make the desired measurement. Since this procedure of removing the end plates will be more or less difficult, it may be preferable in order to reduce the overall time required to remove suspected bundles and replace them with known good ones in order to place the reactor back on stream as soon as possible. The testing of the suspected bundles can then be done with more care and less concern for elapsed time when done outside the reactor itself. Nonetheless, in either case the end plate will ordinarily be removed in order to permit access to the fuel rods. Several improved testing devices have been developed which will assist in easy removal of the end plates by remote control. For purposes of the following discussion, it will be assumed that the end plate has been removed, permitting access to the end cap for testing of the individual rods.

A tool or probe 120 as shown in FIG. 4 is placed over the end of each fuel rod in turn. While this probe is shown here for completeness in understanding the invention, it forms no part of the invention and will be the subject of another patent application. The probe comprises a tubular body 121 which is adapted to fit over the end cap of a fuel rod and thereby place electromagnetic coils 122 contained within the probe 120 adjacent the axial cavity 118 in which the steel rod 117 rests. When the electromagnetic coils 122 are activated, the rod 117 tends to position itself within the magnetic coil 122 and thereby lifts it away from contact with the diaphragm 113. When the electromagnetic coil 122 is switched off, then the rod 117 will drop under the force of gravity to contact the diaphragm 113 and induce vibrations which can be measured.

The measurements are made by a piezoelectric transducer 123 which is bonded to a partially hollowed plug 124 positioned within the tube 121 and above the electromagnetic coils 122 in such a position as to contact the end of the end cap when the probe is properly positioned over the fuel rod. The plug 124 on which the piezoelectric transducer 123 is mounted is slidably movable within the tube 121 and is subjected to spring loading by spring 125 in order to assure firm contact of the transducer 123 with end cap. Leads 126 from the transducer 123 are passed outwardly from the probe 120 to an amplifier and an oscilloscope (not shown) which permit photographing and recording the vibrations which are detected. A typical transducer for this service will be sensitive in the range of 1 KHZ to 200 KHZ, and its resonant frequency is well above the expected vibrations which are to be measured. The process of positioning the probe over the fuel rod, activating the magnetic coil, deactivating the coil, and measuring the vibrations can be carried out within the space of approximately 2 minutes.

Although in the preferred embodiment, the probe just described would be used to test individual rods, it is within the scope of the invention to use a probe designed according to the same principles to test a plurality of fuel rods simultaneously. Also, fuel rods could be constructed to contain means for activating the vibrating assembly so that only detection facilities need be located in the probe body.

FIG. 3 illustrates another preferred embodiment of the invention, substantially the same as that illustrated in FIGS. 2 and 4, with the exception that the diaphragm 113 does not rest directly upon the disc when pressure inside the fuel rod is zero. Instead, it is positioned above the disc 114 by a spacer ring 127 which prevents the disc 114 from contacting the diaphragm 113. As would be expected, the vibrational characteristics of the diaphragm 113 are substantially different when using the second preferred embodiment of FIG. 4, and, accordingly, although the same measuring technique is used, it has been found necessary to utilize a substantially higher frequency range in order to detect changes in pressure within the fuel rod, which will be discusssed further hereinafter.

Figure 6:
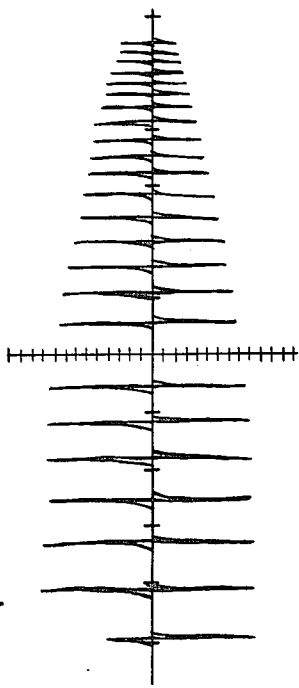
FIG. 6 illustrates the vibrational frequencies characteristic of the embodiment of FIG. 2 when the fuel rod has an internal pressure of 70 psig.

FIGS. 5 and 6 illustrate tracings from an oscilloscope measuring vibrational characteristics of the system with the embodiment of FIGS. 2 and 4. FIG. 5 illustrates the initial zero pressure position before any pressure buildup or, alternatively, in the condition when substantial leakage from the fuel rod has occurred. As has been mentioned heretofore, the rods energy is damped out after only a very few bounces since it is transferring energy not simply to the diaphragm but also to the relatively massive disc 114 on which the diaphragm 113 rests. FIG. 6 illustrates the same system operating with 70 psig pressure under the diaphragm 113. It is clear that once the diaphragm has lifted off the disc under pressure from below that energy transfer will be much less rapid; the oscilloscope trace illustrating the gradual dampening away of the bouncing action of the rod 117. Full scale for the oscilloscope traces of FIGS. 5 and 6 is approximately one second. Thus, the frequency of the rod bounces initially is of the order of 20 cycles per second. Comparing FIGS. 5 and 6, it is clear that the method provides a ready means for detecting whether a significant pressure is present within the fuel rod or, if it is not indicating any pressure after a period of operation, that the fuel rod is a suspected leaker.

Figure 8:
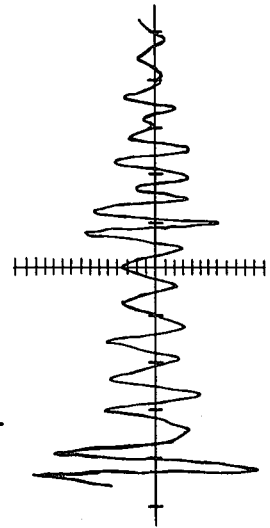
FIG. 8 illustrates the vibrational frequencies characteristic of the embodiment of FIG. 3 when the fuel rod has an internal pressure of 100 psig.

It has been found that the results which are characteristic of the first preferred embodiment illustrated in FIGS. 5 and 6 are not seen when the diaphragm is initially mounted on a spacer away from the disc beneath. One might expect that, in its initial zero pressure position, a tracing similar to FIG. 6 would be obtained and that, once the diaphragm had been forced against the concave surface above it by the pressure from below, that a tracing similar to FIG. 5 would be obtained. In fact, no such sharp distinction is obtained and, accordingly, it has been necessary with the embodiment of FIG. 3 to measure the much higher frequencies which are characteristic of the diaphragm and other resonating parts of the end cap assembly. This is illustrated in FIGS. 7 and 8 where the full scale of the oscilloscope trace is no longer 1 second, but instead, 2 milliseconds, that is, only 1/500 of the full scale trace shown in FIGS. 5 and 6. With this time scale, it is possible to display much higher frequencies such as are characteristic of the diaphragm. With zero pressure within the fuel rod, the diaphragm is free to move in either direction. All of the resonances which occur are displayed on the oscilloscope trace, illustrated here by the very large number of sharp spikes shown. These frequencies are in the general range of up to 40 KHZ. However, once the diaphragm has been forced under pressure against the concave surface above, only a very small portion of the diaphragm surface is able to vibrate freely and, accordingly, most of the very high frequency resonances are damped out and the oscilloscope trace changes as illustrated in FIG. 8. A much lower frequency resonance is seen, which is probably characteristic of one of the more massive portions or combination thereof of the end cap structure. Thus, again, with the second preferred embodiment a clear distinction may be made between a zero pressure condition and a significantly higher pressure. It will be recalled that it has been mentioned that the pressure in a fuel rod may build after a long period of operation to as much as 2500 psig, in which case it will be appreciated that the invention, which is capable of measuring differences in pressure as small as 50 to 100 psig will clearly detect any reasonable pressure which may be built up.

The foregoing description of the preferred embodiments is for illustration of the invention only and should not limit the scope of the invention which is defined by the claims which follow.

What is claimed is:

1. A system for the detection of leakage of fission product gases from a fuel rod comprising in combination:
    a. a hollow longitudinal body containing nuclear fuel for producing fission product gases;
    b. a lower end cap attached to and sealing the lower end of said body;
    c. an upper end cap assembly attached to and sealing the upper end of said body, said assembly comprising:
        i. end cap means extending longitudinally upward from said upper end and having a concave lower surface facing said fuel and including a first cavity extending upward from said lower surface and terminating in said end cap means above said upper end of said body,
        ii. resilient, flexible means operably disposed in said hollow body below and in contact at its edges with said concave lower surface to form a second cavity between said concave lower surface and one side of said flexible means into which said resilient, flexible means can flex, and sealing at least said second cavity from the portion of said hollow body located below said flexible means, said flexible means being flat in its undistorted position, and iii. rigid means operably in contact with the inner surface of said hollow body adjacent to said resilient, flexible means on the side thereof opposite said second cavity, said rigid means having at least one bleed hole which allows any gases developed in said hollow body to contact said flexible means, and iv. contact means having at least a portion thereof normally located in said first and second cavities with one end in contact with said resilient, flexible means, said contact means being freely movable in said first cavity and inducing vibrations in said flexible means when said contact means is raised into said first cavity and thereafter dropped into contact with said flexible means whereby the frequency of said vibrations is a function of pressure applied to the opposite side of said resilient, flexible means, and v. energizable means for raising said contact means into said first cavity spaced longitudinally from said flexible means and for permitting said contact means to drop freely from said first cavity into contact with said resilient, flexible means.

2. A system according to claim 1 wherein said contact means comprises an elongated rod and said energizable means for raising said rod comprises an electromagnetic coil member.

3. A system according to claim 2 including transducer means externally located of said upper end cap means for sensing the vibrational characteristics of said resilient, flexible means.

4. A system according to claim 2 wherein said electromagnetic coil member is constructed and arranged to externally surround said first cavity in said upper end cap means.

5. A system for the detection of leakage of fission product gases from a fuel rod comprising in combination:

a. a fuel rod comprising an elongated hollow tubular body containing nuclear fuel pellets which produce said fission product gases;

b. a lower end cap attached to and sealing the lower end of said body;

c. a plenum chamber located above said fuel pellets and having a plenum chamber spring therein with one end of said spring in contact with said fuel pellets;

d. upper end cap means attached to and sealing the upper end of said body, said upper end cap means having a concave lower surface facing said fuel pellets and including a longitudinal first cavity extending upward from said lower surface and terminating at a location above said upper end of said body in said upper end cap means;

e. flexible flat diaphragm means located in said hollow body below said concave lower surface forming a second cavity between said lower surface and a first side of said flexible means and sealing said second cavity from said plenum chamber located therebelow;

f. rigid disc means secured in said body in contact with the inner surface thereof below said flexible means and in contact with said plenum spring on the second side thereof opposite from said second cavity, said rigid disc means having at least one longitudinal extending opening therein which permits any gases developed in said plenum chamber to contact said flexible means;

g. metal rod means having at least a substantial portion thereof located in said first cavity and mounted for relatively free movement therein and in contact at one end thereof with said flexible means; and h. energizable electromagnetic means operably associated with said upper end cap means and said rod means therein for causing said rod means to be raised into said first cavity upon energization of said electromagnetic means so that said one end thereof is spaced from said flexible means and for permitting said rod to drop freely in said first cavity into contact with said flexible means upon de-energization of said electromagnetic means for inducing vibrations therein which are a function of pressure applied to said second side of said flexible means.

* * * * *